United States Patent
Eleftheriou et al.

(10) Patent No.: US 11,008,116 B2
(45) Date of Patent: May 18, 2021

(54) GAS TURBINE AUXILIARY POWER UNIT

(71) Applicant: PRATT & WHITNEY CANADA CORP., Longueuil (CA)

(72) Inventors: Andreas Eleftheriou, Woodbridge (CA); Daniel Alecu, Toronto (CA); Enzo Macchia, Kleinburg (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 114 days.

(21) Appl. No.: 16/384,270

(22) Filed: Apr. 15, 2019

(65) Prior Publication Data

US 2020/0324909 A1 Oct. 15, 2020

(51) Int. Cl.
  *B64D 41/00* (2006.01)
  *F02C 7/32* (2006.01)
  *F02C 3/09* (2006.01)

(52) U.S. Cl.
  CPC ............ *B64D 41/00* (2013.01); *F02C 3/09* (2013.01); *F02C 7/32* (2013.01)

(58) Field of Classification Search
  CPC .. F23L 15/04; F02C 7/105; F02C 7/10; F02C 7/08; F02C 7/32; B64D 2041/002; B64D 2033/0213; F05B 2250/50
  See application file for complete search history.

(56) References Cited

U.S. PATENT DOCUMENTS

| | | | |
|---|---|---|---|
| 5,119,624 A * | 6/1992 | McKenna | F02C 6/20 60/39.511 |
| 7,251,942 B2 | 8/2007 | Dittmar et al. | |
| 10,054,051 B2 * | 8/2018 | Foutch | F02K 3/02 |
| 2013/0139519 A1 | 6/2013 | Kesseli et al. | |
| 2013/0255268 A1 * | 10/2013 | Eleftheriou | F02C 7/08 60/772 |
| 2017/0037776 A1 | 2/2017 | Jones et al. | |
| 2017/0106985 A1 | 4/2017 | Stieger et al. | |

* cited by examiner

*Primary Examiner* — Ehud Gartenberg
*Assistant Examiner* — Jacek Lisowski
(74) *Attorney, Agent, or Firm* — Norton Ruse Fulbright Canada LLP (57) ABSTRACT

A gas turbine engine includes a supply air conduit fluidly connected to an inlet of a combustion chamber to convey supply air to the combustion chamber, an exhaust conduit fluidly connected to an exit of the combustion chamber to convey exhaust gases away from the combustion chamber, and a recuperator defining a first flow path and a second flow path therethrough, the second flow path being in heat transfer communication with the first flow path, the first flow path defining part of the supply air conduit, the second flow path defining part of the exhaust conduit. Methods of operating the engine are also provided.

30 Claims, 3 Drawing Sheets

GAS TURBINE AUXILIARY POWER UNIT

TECHNICAL FIELD

The application relates generally to gas turbine auxiliary power units for aircrafts.

BACKGROUND

Improvements in gas turbine auxiliary power units, for example to develop auxiliary power units that generate less noise and/or operate at lower exhaust gas temperatures, remain desirable. As another example, it may be desirable to develop gas turbine auxiliary power units that require less power to start, that have higher operating efficiency in at least certain operating conditions, that may be relatively more compact and/or lighter than at least some prior art gas turbine auxiliary power units of similar output, and/or that may be relatively more easy and/or less costly to manufacture.

SUMMARY

There is therefore provided a gas turbine engine, comprising: a supply air conduit fluidly connected to an inlet of a combustion chamber to convey supply air to the combustion chamber, an exhaust conduit fluidly connected to an exit of the combustion chamber to convey exhaust gases away from the combustion chamber, and a recuperator defining a first flow path and a second flow path therethrough, the second flow path being in heat transfer communication with the first flow path, the first flow path defining part of the supply air conduit, the second flow path defining part of the exhaust conduit, the recuperator structurally supporting at least part of the exhaust conduit.

In some embodiments, the recuperator is disposed at least in part in the exhaust conduit and at least in part in the supply air conduit.

In some embodiments, the exhaust conduit is defined in part by an exhaust duct, the recuperator is at one end fixed relative to the exhaust duct and at another end is movable relative to the exhaust duct in response to thermal expansion.

In some embodiments, the recuperator is at the one end fixed to an air inlet of the combustion chamber.

In some embodiments, the recuperator, the combustion chamber and the exhaust duct define a knot-shaped gas flow path.

In some embodiments, the gas flow path includes at least one U-turn portion.

In some embodiments, the recuperator is a cross-flow heat exchanger adapted to transfer heat from the exhaust gases leaving the combustion chamber to the air being supplied to the combustion chamber before the air enters the combustion chamber.

In some embodiments, the gas turbine engine is an auxiliary power unit adapted to provide compressed air to an aircraft, and further comprising a high pressure turbine driven by the exhaust gases from the combustion chamber, a low pressure turbine located downstream of the high pressure turbine and driven by the exhaust gases from the combustion chamber, a core compressor driven by the low pressure turbine to supply air to the combustion chamber, and a load compressor driven by the high pressure turbine to pressurize and supply the compressed air to the aircraft.

In some embodiments, the low pressure turbine is operatively connected to the core compressor by a low pressure spool rotatable about a rotation axis, the high pressure turbine is operatively connected to the load compressor by a high pressure spool rotatable about the rotation axis, and the high pressure spool is decoupled from the low pressure spool.

In some embodiments, the load compressor is selectively operable by an auxiliary power source and is selectively fluidly connectable to the combustion chamber via at least one valve disposed between the load compressor and the combustion chamber.

In some embodiments, the low pressure turbine and the high pressure turbine are disposed between the load compressor and the core compressor.

In some embodiments, the load compressor is selectively connectable to the inlet of the combustor, the load compressor connected to an actuator powered by an external power source, the load compressor being driven by the actuator at least during a part of a start-up cycle of the APU.

In some embodiments, the load compressor is configured to pressurize air to a pressure higher than a pressure of sustained combustion in the combustion chamber.

In some embodiments, the load compressor is configured to pressurize air to a pressure higher than a pressure of air pressurized by the core compressor during post-start-up operation of the APU.

In some embodiments, the load compressor is connected to the high pressure turbine by a high pressure spool rotatable about a rotation axis, the core compressor is connected to the low pressure turbine by a low pressure spool rotatable about the rotation axis, and the low pressure spool is decoupled from the high pressure spool.

There is also provided a turbine auxiliary power unit (APU), comprising: a combustion chamber, a supply air conduit fluidly connected to the combustion chamber to supply air to the combustion chamber, and an exhaust conduit fluidly connected to the combustion chamber to convey exhaust gases from the combustion chamber, the supply air conduit and the exhaust conduit being in part defined by a recuperator, the recuperator supporting at least part of the supply air conduit on the exhaust conduit.

In some embodiments, the gas turbine APU further comprises a casing, the casing supporting the exhaust conduit.

In some embodiments, the exhaust conduit is defined in part by an exhaust duct, the recuperator is at one end fixed relative to the exhaust duct and at another end is movable relative to the exhaust duct in response to thermal expansion.

In some embodiments, the recuperator is at the one end fixed to an air inlet of the combustion chamber and fluidly connects the supply air conduit to the air inlet.

In some embodiments, the recuperator, the combustion chamber and the exhaust duct define a gas flow path, and the gas flow path includes: i) a U-turn portion upstream of the recuperator, and ii) a point in the recuperator at which the exhaust gases overlap with a flow of the air, the exhaust gases being fluidly separated from the flow of the air in the recuperator.

In some embodiments, the recuperator is disposed in heat transfer communication with the exhaust gases of the exhaust conduit and the supply air of the supply conduit.

In some embodiments, gas turbine APU further comprises a high pressure turbine driven by the exhaust gases from the combustion chamber, a low pressure turbine located downstream of the high pressure turbine and driven by the exhaust gases from the combustion chamber, a core compressor driven by the low pressure turbine to supply air to the combustion chamber, and a load compressor driven by the high pressure turbine to pressurize and supply compressed air to an aircraft.

In some embodiments, the low pressure turbine is operatively connected to the core compressor by a low pressure spool rotatable about a rotation axis, the high pressure turbine is operatively connected to the load compressor by a high pressure spool rotatable about the rotation axis, and the high pressure spool is decoupled from the low pressure spool.

In some embodiments, the load compressor is selectively operable by an auxiliary power source and is selectively fluidly connectable to the combustion chamber via at least one valve disposed between the load compressor and the combustion chamber.

In some embodiments, the low pressure turbine and the high pressure turbine are disposed between the load compressor and the core compressor.

In some embodiments, the load compressor is selectively connectable to the inlet of the combustor, the load compressor connected to an actuator powered by an external power source, the load compressor being driven by the actuator at least during a part of a start-up cycle of the APU.

In some embodiments, the load compressor is configured to pressurize air to a pressure higher than a pressure of sustained combustion in the combustion chamber.

In some embodiments, the load compressor is configured to pressurize air to a pressure higher than a pressure of air pressurized by the core compressor during post-start-up operation of the APU.

In some embodiments, the load compressor is connected to the high pressure turbine by a high pressure spool rotatable about a rotation axis, the core compressor is connected to the low pressure turbine by a low pressure spool rotatable about the rotation axis, and the low pressure spool is decoupled from the high pressure spool.

In yet a further aspect, there is provided a gas turbine auxiliary power unit (APU), comprising: a casing at least partially supporting a recuperator, a combustion chamber supported by the casing, the combustion chamber having an inlet fluidly connected to a first part of the recuperator, the inlet receiving air through the first part when the APU is in use, and an exit, and an exhaust duct fluidly connecting the exit to a second part of the recuperator, the exhaust duct exhausting exhaust gases from the combustion chamber via the exit and then via the second part when the APU is in use, the exhaust duct being attached to the recuperator so as to be structurally supported thereby.

In some embodiments, the gas turbine APU comprises a low pressure spool rotatable about a rotation axis, a low pressure turbine in fluid communication with the exhaust duct, the low pressure turbine being operatively connected to the low pressure spool, and and a core compressor fluidly connected to the first part of the recuperator, the core compressor being operatively connected to the low pressure spool, the core compressor producing a lower compression ratio than the load compressor.

In some embodiments, the exhaust duct is disposed at least in part between the recuperator and the low pressure spool.

In some embodiments, the exhaust duct is disposed at least in part between the core compressor and the combustion chamber.

In some embodiments, the exhaust duct is disposed at least in part between the low pressure turbine and the recuperator.

In some embodiments, the gas turbine APU comprises a high pressure spool rotatable about the rotation axis, a high pressure turbine in fluid communication with the exhaust duct, the high pressure turbine being operatively connected to the high pressure spool, and and a load compressor operatively connected to the high pressure spool, the load compressor being adapted to pressurize and supply a fluid to a subsystem of an aircraft.

In some embodiments, the combustion chamber is disposed at least in part between the load compressor and the recuperator.

There is also provided a method of operating a gas turbine engine, comprising operating a combustion chamber of the gas turbine engine to produce exhaust gases, directing at least part of the exhaust gases to a low pressure turbine to drive a core compressor to compress ambient air at a first compression ratio to generate a supply of pressurized air entering the combustion chamber, and directing at least part of the exhaust gases to a high pressure turbine to drive a load compressor to compress a fluid at a second compression ratio to generate a pressurized fluid, the second compression ratio being higher than the first compression ratio.

In some embodiments, the method further comprises directing the pressurized fluid to a subsystem of an aircraft and thereby enabling operation of the subsystem.

In some embodiments, the pressurized fluid is pressurized air, and the method includes, in response to an indication that the subsystem does not require the pressurized fluid while the combustion chamber is operating, redirecting the pressurized air into the combustion chamber.

In some embodiments, the method further comprises in response to the indication being present for a pre-determined time period, stopping the operating the combustion chamber.

In some embodiments, the method further comprises, prior to the operating the combustion chamber, driving the core compressor using an actuator powered by an external power source at a third compression ratio to generate pressurized air, the third compression ratio being lower than the first and second compression ratios, directing the pressurized air into the combustion chamber, supplying fuel into the combustion chamber, and igniting the fuel to start the operating the combustion chamber.

There is further provided a method of starting a gas turbine auxiliary power unit (APU) of an aircraft, comprising driving a load compressor of the APU using an actuator powered by an external power source, the load compressor adapted to pressurize and supply air to the aircraft, directing at least part of the air pressurized by the load compressor into a combustion chamber of the APU, supplying fuel into the combustion chamber, igniting the fuel to initiate combustion in the combustion chamber, the combustion generating exhaust gases, and driving a turbine of the APU downstream of the combustion chamber using the exhaust gases, the turbine driving a core compressor of the APU to pressurize and supply ambient air into the combustion chamber to sustain the combustion.

In some embodiments, the turbine is a low pressure turbine, the APU inludes a high pressure turbine upstream of the low pressure turbine relative to a flow of the exhaust gases, and the high pressure turbine drives the load compressor.

In some embodiments, the actuator is an electric motor.

In some embodiments, the electric motor is part of the aircraft.

In some embodiments, during operation of the APU the core compressor produces a first compression ratio and the load compressor produces a second compression ratio, and the second compression ratio is higher than the first compression ratio.

In some embodiments, the driving the load compressor using the actuator includes the load compressor producing a third compression ratio that is lower than the second compression ratio.

In some embodiments, the third compression ratio is lower than the first compression ratio.

In some embodiments, the method further comprises fluidly disconnecting the load compressor from the combustion chamber after a predetermined time period following the step of igniting the fuel.

In some embodiments, the method further comprises directing the air pressurized by the load compressor to the aircraft.

In some embodiments, the method further comprises, in response to an indication that the aircraft does not require the air pressurized by the load compressor while combustion is sustained in the combustion chamber, directing the pressurized air into the combustion chamber.

BRIEF DESCRIPTION OF THE DRAWINGS

Reference is now made to the accompanying figures in which.

DETAILED DESCRIPTION

For the purposes of the present description, the term "conduit" is used to describe an arrangement of one or more elements, such as one or more hoses, ducts, heat exchangers, connectors and other elements, that together form a flow path or flow paths for a fluid to flow from point A to point B.

Figure 1:
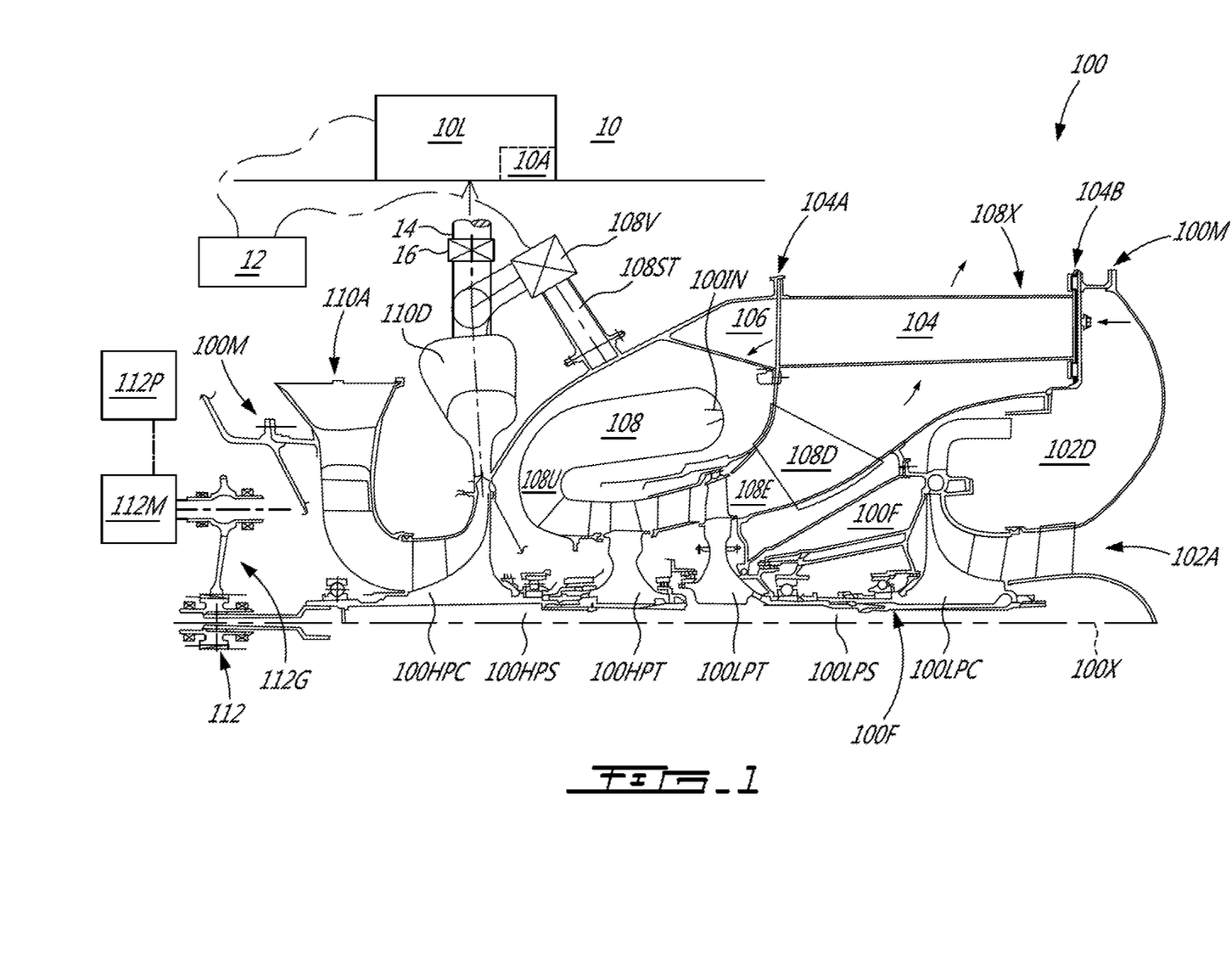
FIG. 1 is a schematic side view showing an auxiliary power unit.

FIG. 1 schematically shows a gas turbine auxiliary power unit (APU) 100 serving an aircraft 10, and more particularly supplying compressed air to one or more loads/subsystems 10L of the aircraft 10. In a particular embodiment, the APU 100 supplies compressed air (a.k.a. bleed air or working air) to a pneumatic system 10L of the aircraft 10. In some embodiments, the pneumatic system 10L provides cabin pressurization and/or cabin air conditioning and/or anti-icing functionality and/or enables main engine start of the aircraft 10. The APU 100 is one particular example of an engine with respect to which, or in which, the present technology may be used. The skilled reader will appreciate that the present description may be applied to any suitable-type of engine.

In the present embodiment, the APU 100 is mounted to the aircraft 10 via a plurality of engine mounts 100M. In the present embodiment, the APU 100 includes an air inlet 102A fluidly connected to an inlet of a core compressor 100LPC. The core compressor 100LPC is connected to a low pressure spool 100LPS rotatable about a central axis 100X. A low pressure turbine 100LPT is connected to the low pressure spool 100LPS to drive the low pressure spool 100LPS and the core compressor 100LPC about the central axis 100X. The low pressure spool 100LPS is rotatably supported by bearings (not labeled) which are in turn supported by a frame or support structure 100F of the APU 100, which may, in one particular embodiment, be generally conical in shape. In the present embodiment, the frame 100F is defined by a plurality of webs (not labeled), but other suitable constructions may be employed.

When the core compressor 100LPC is driven about the central axis 100X, it draws ambient air into the air inlet 102A of the APU 100 (hereinafter, "supply air"). The core compressor 100LPC compresses and moves the supply air into an inlet duct/cold air plenum 102D, then through a supply air flow path defined by/through a recuperator/heat exchanger 104, then into an inlet duct 106, and then into a combustion chamber 108 of the APU 100. The foregoing elements define a supply air conduit fluidly connected to an inlet 106 of the combustion chamber 108 to supply ambient air to the combustion chamber 108 for combustion. In the present embodiment, the air inlet 102A is a conical and is defined and supported in part by a wall of the inlet duct/cold air plenum 102D.

In the present embodiment, the core compressor 100LPC is selected to operate at a first compression ratio, which is indicative of a degree of air compression provided by the core compressor 100LPC. In some embodiments the first compression ratio is 4:1. This means that in such embodiments the core compressor 100LPC compresses the ambient air drawn into the air inlet 102A to four times the ambient air pressure. The first compression ratio may be any suitable compression ratio to suit each particular embodiment and application of the APU 100.

During operation of the APU 100, the supply air entering the inlet 106 of the combustion chamber 108 is mixed with fuel that is injected into the combustion chamber 108 via one or more fuel nozzles/injectors 100IN. The fuel nozzles/injectors 100IN may be of any type suitable fuel injection arrangement to suit the particular embodiment and application of the APU 100. The air/fuel mixture is combusted to generate exhaust gases.

The hot exhaust gases exit the combustion chamber 108 via an exit (not labeled) thereof, pass through and drive first a high pressure turbine 100HPT and then the low pressure turbine 100LPT. The exhaust gases leaving the low pressure turbine 100LPT pass through the duct 108D and flow through the recuperator/heat exchanger 104 before being exhausted from the APU 100 via an exit 108X defined by the recuperator/heat exchanger 104. In the present embodiment, the exhaust duct 108D is attached to and supported by the frame 100F of the APU 100.

The recuperator/heat exchanger 104 is in turn supported by the exhaust duct 108D. In this embodiment, the recuperator/heat exchanger 104 is connected at one end thereof to the inlet duct 106 via a flange 104A and at another end thereof is connected to the inlet duct 102D via a flange 104B. In this embodiment, the flange 104B provides for some relative movement between the recuperator/heat exchanger 104 and the inlet duct 102D. This connection absorbs at least some of the thermal expansion of the recuperator/heat exchanger 104 that may occur while the APU 100 is in use.

The exhaust flow path is fluidly separated/sealed from the supply air flow path in the recuperator/heat exchanger 104, such that the exhaust gases do not mix with and do not recirculate to the inlet of the combustion chamber 108. The recuperator/heat exchanger 104 transfers heat from the exhaust gases passing therethrough to the supply air passing therethrough. The recuperator/heat exchanger 104 and the exhaust gases thereby pre-heat the supply air before the supply air enters the inlet of the combustion chamber 108. In some applications and at least in some operating conditions, this helps increase an operating efficiency of the APU 100.

As shown, in the present embodiment, the exhaust conduit defined by the duct 108D fluidly connected to the exit 108E of the low pressure turbine 100LPT to convey exhaust gases from the combustion chamber 108 via the recuperator/heat exchanger 104. As shown, the combustion chamber 108 has an annular U-shape configuration that includes a U-turn portion 108U. In at least some embodiments and operating conditions, the U-turn portion 108U helps attenuate some of the sound generated by the combustion process and the exhaust gases that exits the APU 100 via the recuperator/heat exchanger 104. In at least some embodiments and applications, the U-turn portion 108U helps reduce at least one overall dimension of, and hence a size of, the APU 100.

As shown, in the present embodiment, the recuperator/heat exchanger 104 structurally supports at least part of the exhaust conduit 108D. In the present embodiment, in one aspect, this is achieved by the exhaust conduit 108D being defined in part by the exhaust duct 108D, the recuperator/heat exchanger 104 being at one end fixed relative to the exhaust duct 108D and at another end being movable relative to the exhaust duct 108D in response to thermal expansion.

In a further aspect, in the present embodiment, the recuperator/heat exchanger 104 is at the one end further fixed to the air inlet 106 of the combustion chamber 108. Yet further in the present embodiment, a frame 100F of the APU 100 at least indirectly supports the recuperator/heat exchanger 104, and the recuperator/heat exchanger 104 thus supports the exhaust duct 108D relative to the frame 100F. In the present embodiment, the combustion chamber 108 is supported by the frame 100F.

Still referring to FIG. 1, the APU 100 includes the high pressure turbine 100HPT referred to above. The high pressure turbine 100HPT is disposed in part in the exhaust conduit 108D, upstream of the low pressure turbine 100LPT, to be driven by the exhaust gases.

The high pressure turbine 100HPT is connected to a high pressure spool 100HPS which in this embodiment is rotatable about the central axis 100X. The high pressure spool 100HPS is rotatably supported by bearings (not labeled) which are in turn supported by the frame 100F of the APU 100. In other embodiments, the high pressure spool 100HPS may be non-coaxial with the low pressure spool 100LPS. In the present embodiment, the high pressure turbine 100HPT is decoupled from the low pressure spool 100LPS and is thus rotatable independently therefrom. This allows for some and/or improves efficiency of some of the functionality of the APU 100 described later in this document.

The high pressure spool 100HPS connects to a load compressor 100HPC, which is fluidly connected to an ambient/working air inlet 110A. When the combustion chamber 108 operates and produces the exhaust gases, the exhaust gases pass through and drive the high pressure turbine 100HPT. This drives the high pressure spool 100HPS and the load compressor 100HPC about the central axis 100X. When the load compressor 100HPC is driven, it draws ambient air into the air inlet 110A (hereinafter, "working air").

Still referring to FIG. 1, the load compressor 100HPC compresses and moves the working air into a working air duct 110D, and then to the subsystem(s) 10L of the aircraft 10 via one or more suitable fluid conduits 14 and one or more corresponding bleed valves 16 that may control the supply of the compressed air to the subsystem(s) 10L. The subsystem(s) 10L operate at least in part on the working air. In some embodiments, the load compressor 100HPC may be configured to pressurize a different fluid instead of ambient air, and may accordingly have a different fluid inlet instead of the air inlet 110A.

In the present embodiment, the load compressor 100HPC (in this embodiment, the high pressure compressor) is selected to operate at a second compression ratio. The second compression ratio is indicative of a degree of air compression provided by the load compressor 100HPC. In some embodiments the second air compression ratio is 5:1. This means that in such embodiments the load compressor 100HPC compresses the ambient air drawn into the air inlet 102A to five times the ambient air pressure.

The load compressor 100HPC, the second compression ratio, and the fluid conduit(s) 14, may be selected to provide a pressure and flow rate of the working fluid that is suitable to operate each particular embodiment and combination of the subsystem(s) 10L of the aircraft 10. The second compression ratio may be any suitable compression ratio to suit each particular embodiment and application of the APU 100, so long as the second air compression ratio is greater than the first air compression ratio (produced by the core compressor 100LPC).

As noted above, in the present embodiment, the second compression ratio provided by the load compressor 100HPC is higher than the first compression ratio provided by the core compressor 100LPC. In other words, in the present embodiment, the load compressor 100HPC is configured to pressurize air to a pressure higher than a pressure of sustained combustion in the combustion chamber 108, the latter being determined by the first compression ratio provided by the core compressor 100LPC.

Stated yet from an additional perspective, the load compressor 100HPC is configured to pressurize air to a pressure higher than a pressure of air pressurized by the core compressor 100LPC during post-start-up operation of the APU. In at least some applications and operating conditions, this configuration helps to improve the operating efficiency of the APU 100. For example, in some embodiments and applications thereof, the APU 100 may be operated both for starting one or more engines (one example of a load/subsystem 10L) of the aircraft 10, and in-flight for serving other loads/subsystems 10L of the aircraft 10.

At various times during operation of the APU 100, one or more of the loads/subsystems 10L may provide an indication, such as a signal, to a controller 12, when the one or more of the loads/subsystems 10L do, and do not, require a supply of the working fluid. In the present embodiment, the controller 12 is part of the APU 100. However, any suitable controller(s) may be used to provide for the functionality described. For example, the controller(s) 12 may be one or more of the controllers of the aircraft 10 and/or of the APU 100. The controller(s) 12 may be digital, pneumatic, of any other suitable type, and/or a combination of different types of controllers.

In at least some cases when the indication/signal indicative of no air requirement is received at the controller(s) 12, and for example for at least a part of a duration of the indication/signal, the APU 100 may divert the working air from the one or more of the loads/subsystems 10L into the combustion chamber 108.

In the present embodiment, the diversion of the working air is enabled by the fact that the load compressor 100HPC provides a higher compression ratio, and hence a higher pressure, with respect to the working air than the compression ratio, and hence pressure, provided by the core compressor 100LPC with respect to the supply air. As a result, in the present embodiment, combustion of air and fuel in the combustion chamber 108 occurs at a pressure that is lower than the pressure of the working air. The lower pressure in the combustion chamber 108 allows the higher pressure working air to flow into the combustion chamber 108.

As shown in FIG. 1, in the present embodiment the APU 100 includes a bypass fluid conduit 108ST for diverting the working air into or proximate the inlet of the combustion chamber 108. The bypass fluid conduit 108ST is defined in part by a valve 108V. The valve 108V is operatively coupled to the controller(s) 12. The controller(s) 12 operates the valve 108V to selectively fluidly connect the working air duct 110D to the combustion chamber 108 via the bypass fluid conduit 108ST in response to receiving the signal(s) indicative that one or more of the loads/subsystems 10L do not require the working air.

In the present embodiment, the controller(s) 12 operates the valve 108V to selectively fluidly disconnect the working air duct 110D from the combustion chamber 108 when the signal(s) is/are no longer received, or when another signal indicative that the one or more of the loads/subsystems 10L require the working air is received. Any suitable control sequence may be used to suit the particular embodiment and application of the APU 100 and/or the particular embodiment and combination of the load(s)/subsystem(s) 10L served by the APU 100.

Any suitable configuration of the bypass fluid conduit(s) 108ST may be used. More than one valve 108V may be used. Any suitable communication/link may be used to interconnect the controller(s) 12, the valve(s) 108V and the one or more loads/subsystems 10L to provide for the functionality described in this document. For example, the signal(s) indicative of whether or not the one or more loads/subsystems 10L require a supply of the working air from the load compressor 100HPC may be received at the controller(s) 12 wirelessly, by wire, or by other means such as via a pneumatic signal.

In at least some embodiments of the APU 100, diverting the working air as described above may allow to continue (and not terminate) combustion in the combustion chamber 108 at least for a given period of time. In some cases, this may improve an operating efficiency, or at least some operating characteristics, of the APU 100 when serving one or more load(s)/subsystem(s) 10L with intermittent working air requirements.

In another aspect, as shown in FIG. 1, in the present embodiment, the exhaust duct 108D of the APU 100 is disposed at least in part between the recuperator/heat exchanger 104 and the low pressure spool 100LPS, and at least in part between the core compressor 100LPC and the combustion chamber 108. In the present embodiment, the exhaust duct 108D is disposed at least in part between the low pressure turbine 100LPT and the recuperator/heat exchanger 104. Yet further in the present embodiment, the combustion chamber 108 is disposed at least in part between the load compressor 100HPC and the recuperator/heat exchanger 104. Yet further in the present embodiment, the low pressure turbine 100LPT and the high pressure turbine 100HPT are disposed between the load compressor 100HPC and the core compressor 100LPC.

In at least some cases, engine architecture including one or more of the above configurations helps make the APU 100 more compact relative to at least some prior art APU's of similar output. It will be understood that any suitable APU 100 layout may be used, and not only that as described.

Figure 2:
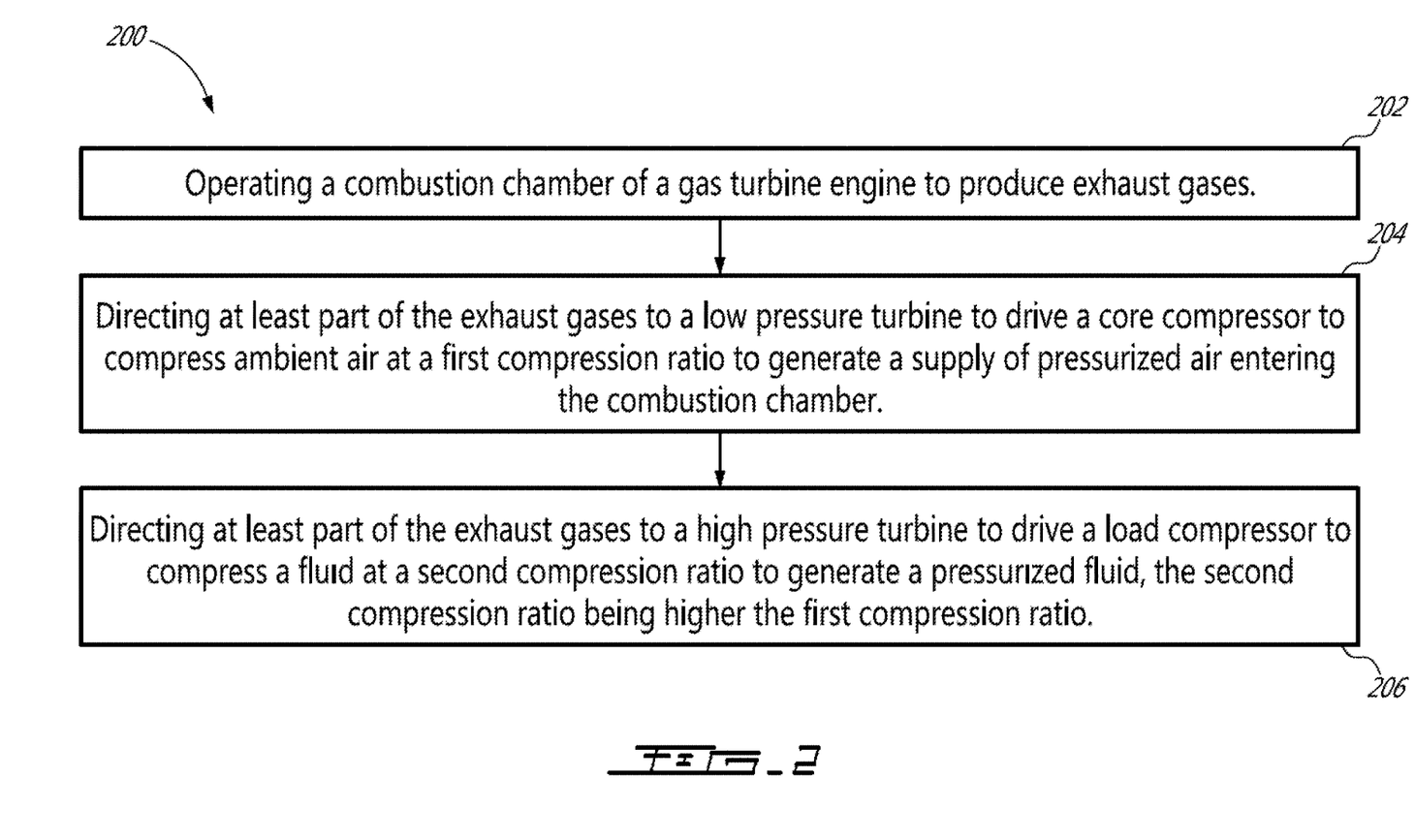
FIG. 2 is a schematic flow diagram showing a method of operating a gas turbine engine, such as the APU of FIG. 1.

In yet another aspect, and now referring to FIG. 2, there is provided a method 200 of operating a gas turbine engine, such as the APU 100. The method 200 includes a step 202 of operating a combustion chamber 108 of the gas turbine engine 100 to produce exhaust gases. The method 200 includes a step 204 of directing at least part of the exhaust gases to a low pressure turbine 100LPT to drive a core compressor 100LPC to compress ambient air at a first compression ratio to generate a supply of pressurized air (i.e., "supply air") entering the combustion chamber 108.

The method 200 includes a step 206 of directing at least part of the exhaust gases to a high pressure turbine 100HPT to drive a load compressor 100HPC to compress a fluid, such as ambient air, at a second compression ratio to generate a pressurized fluid, such as pressurized working air. In some such embodiments, as described above, the second compression ratio is higher than the first compression ratio, so that the working fluid/air is at a higher pressure than the pressure of combustion in the combustion chamber 108. The working fluid/air may then be used in one or more different applications.

For example, in some embodiments, the method 200 may include a step of directing the pressurized fluid, such as the working air, to a subsystem 10L of an aircraft 10 and thereby enabling operation of the subsystem 10L. For example, in some embodiments, a given subsystem 10L may include one or more pneumatic actuators 10A. The actuator(s) 10A may be controlled by one or more controllers (such as the controller(s) 12 for example) and which may operate by the force provided by the working air. In some embodiments, the step may be executed by the controller(s) 12 closing and/or maintaining the valve 108V closed, and opening a corresponding one or more of the bleed valves 16.

In some embodiments, the method 200 may include a step of redirecting the pressurized air (i.e. working air) into the combustion chamber 108 in response to an indication that the subsystem(s) 10L do/does not require the pressurized fluid (in the embodiment of FIG. 1, working air) while the combustion chamber 108 is operating (i.e. while combustion is present).

In some such cases, the working air is at least in part consumed in the combustion occurring in the combustion chamber 108. In some embodiments and applications, the method 200 may further include, in response to the indication being present for a pre-determined time period, stopping the operating the combustion chamber 108 (i.e. stopping combustion). Other stop-combustion conditions may be used, depending on each particular embodiment and application of the APU 100 and/or the system(s) 10L served by the APU 100. In some embodiments and applications, the APU 100 is operated in flight and thus combustion in the combustion chamber 108 of the APU 100 may be sustained throughout flight and/or at least during parts of the flight that occur at altitudes below a threshold altitude above which operation of the APU 100 may be terminated.

The method 200 and operation of the APU 100 described above relates to the APU 100 during operation, such as in-flight, after having executed a start-up cycle that initiated and sustained combustion in the combustion chamber 108. Thus, the pressure/compression ratios described above are provided by the respective compressors 100LPC and 100HPC during operation of the APU 100, after the APU 100 has been started.

In the present embodiment, for executing a start-up cycle of the APU 100, and more particularly for initiating combustion in the combustion chamber 108, the high pressure spool 100HPS of the APU 100 is operatively connected to an actuator 112M via a gearbox 112G or other suitable connecting means. The actuator 112M is powered by an external power source 112P. In the present embodiment, the actuator 112M is an electric motor, but other actuators are likewise possible. The external power source 112P is referred to as "external" because it does not take power from the turbines 100LPT, 100HPT or other part of the gas turbine engine of the APU 100. In the present example, the external power source 112P is a battery suitable for each particular application and embodiment of the APU 100, but other external power sources are likewise possible.

The gearbox 112G is likewise selected to be suitable for each particular embodiment and application of the APU 100. The gearbox 112G may be any suitable gearbox, such as a conventional gearbox in one example. In the present embodiment, the actuator 112M, the external power source 112P, and the gearbox 112G are part of the APU 100. In some embodiments, the actuator 112M and/or the external power source 112P and/or gearbox 112G may be separate from the APU 100 and may be selectively operatively connectable to the APU 100 for starting the APU 100. In some embodiments, the actuator 112M and/or the external power source 112P and/or gearbox 112G may be part of the aircraft 10.

Figure 3:
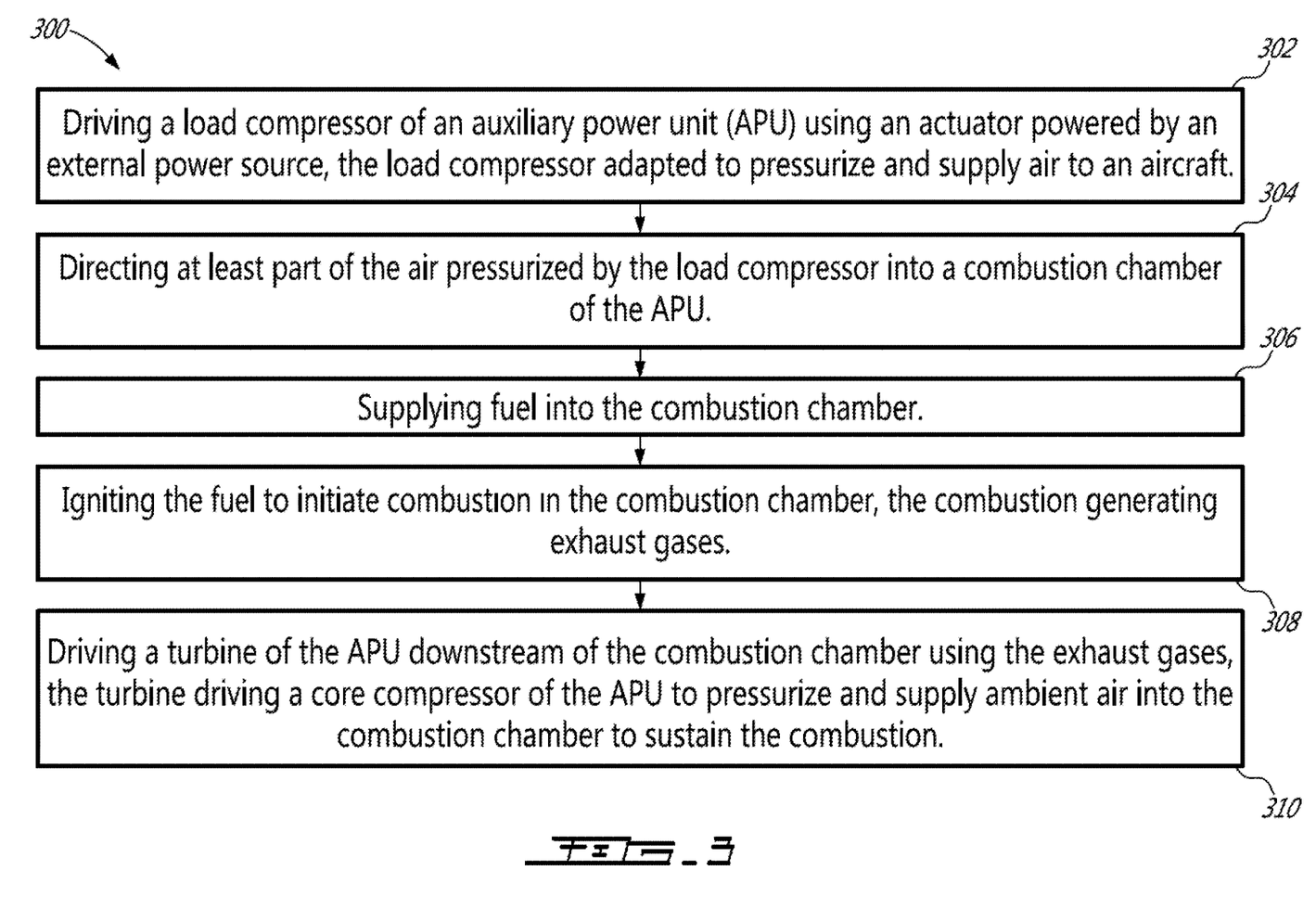
FIG. 3 is a schematic flow diagram showing a method of starting the APU of FIG. 1.

Using the above structure, and more particularly with the engine architecture described above, the present technology provides a method 300 of starting a gas turbine APU 100 of an aircraft 10. While the method 300 is described and illustrated herein with respect to the APU 100, the method 300 and the engine architecture described herein may be used with respect to any suitable gas turbine engine layouts, and indeed it will be understood that any suitable engine layout may be employed.

As shown in FIG. 3, in some embodiments, the method 300 includes a step 302 of driving a load compressor 100HPC of the APU 100 using an actuator 112M, such as the electric motor 112M for example, powered by an external power source 112P, such as the battery 112P. The load compressor 100HPC being driven by the actuator 112M pressurizes and supplies air, in the above embodiments to the working air duct 110D. In some such embodiments, the load compressor 100HPC may supply the working air to the aircraft 10 while being driven by the actuator 112M.

The method 300 may include a step 304 of directing at least part of the air pressurized by the load compressor 100HPC being driven by the actuator 112M into a combustion chamber 108 of the APU 100, a step 306 of supplying fuel into the combustion chamber 108 (e.g. via one or more fuel injectors/nozzles disposed therein), and a step 308 of igniting the fuel to initiate combustion in the combustion chamber 108, the combustion generating exhaust gases. Fuel ignition may be executed using any suitable and/or known means. The driving of the load compressor 100HPC by the actuator 112M may thereby allow to execute a start-up cycle of the APU 100.

To this end, the method 300 may include a step 310 of driving a turbine 100LPT of the APU 100 downstream of the combustion chamber 108 using the exhaust gases, the turbine 100LPT driving a core compressor 100LPC of the APU 100 to pressurize and supply ambient air into the combustion chamber 108 to sustain the combustion and thereby put the APU 100 into sustained post-start-up operation. As seen above, in at least some embodiments, the turbine 100LPT is a low pressure turbine 100LPT, the APU 100 includes a high pressure turbine 100HPT upstream of the low pressure turbine 100LPT relative to a flow of the exhaust gases from the combustion chamber 108, and the high pressure turbine 100HPT drives the load compressor.

In some embodiments, the step 302 of the driving the load compressor 100HPC using the actuator 112M includes the load compressor 100HPC producing a third compression ratio that is lower than the compression ratio ("second compression ratio") produced by the load compressor 100HPC during post-start-up operation of the APU 100 as described above. In some embodiments, the third compression ratio is lower than the compression ratio ("first compression ratio") produced by the core compressor 100LPC during post-start-up operation of the APU 100 as described above.

In at least some embodiments, this type of start-up cycle operation is enabled by the engine architecture described above. In some embodiments, the engine architecture may allow the actuator 112M and the external power source 112P to use/output/be-driven-at relatively less power while still providing for a successful start of the APU 100, in comparison with at least some prior art APU's of similar capacity.

The method 300 may further include a step 312 of fluidly disconnecting the load compressor 100HPC from the combustion chamber 108 after a predetermined time period following the step 308 of igniting the fuel and/or once combustion becomes sustained by operation of the core compressor 100LPC. The predetermined time period may be a pre-set variable, or may be determined using suitable means such as one or more sensors operable to indicate when combustion has been established and sustained in the combustion chamber 108.

Further, in some embodiments in which the actuator 112M is an electric motor, the engine architecture described above allows to use the electric motor 112M as an electric generator during operation of the APU 100. During such operation, the valve(s) 108V may be used to modulate a power output from the high pressure turbine 100HPT to the electric motor/generator 112M. For example, to increase the power output to the electric motor/generator 112M, the valve(s) 108V may be opened so as to provide for additional airflow to the combustion chamber 108.

In some such cases, the additional air supply may also allow to inject fuel at a higher rate into the combustion chamber 108 and to thereby produce more exhaust gasses, hence increasing the power absorbed by the high pressure turbine 100HPT and transmitted to the electric motor/generator 112M. In some embodiments, control of the fuel flow and other operating parameters of the APU 100 may be provided by the controller(s) 12. Power produced by the electric motor/generator 112M may be used to power one or more subsystems of the aircraft 10 for example.

The APU 100 of the present technology, and the related components and machine(s) in which the present technology may be used, may be constructed using known materials and manufacturing methods.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:
1. A gas turbine engine, comprising:
a supply air conduit fluidly connected to an air inlet of a combustion chamber to convey supply air to the combustion chamber, the supply air conduit including an inlet duct defining a first air inlet;

an exhaust conduit fluidly connected to an exit of the combustion chamber to convey exhaust gases away from the combustion chamber, the exhaust conduit including an exhaust duct;

and a recuperator defining a first flow path and a second flow path therethrough, the second flow path being in heat transfer communication with the first flow path, the first flow path defining part of the supply air conduit, the second flow path defining part of the exhaust conduit, the recuperator structurally supporting at least part of the exhaust duct, one end of the recuperator being fixed to the exhaust duct and to the inlet duct, another end of the recuperator being movable relative to the exhaust duct and the inlet duct in response to thermal expansion;

wherein the gas turbine engine is an auxiliary power unit adapted to provide compressed working air to an aircraft, and further comprising a high pressure turbine driven by the exhaust gases from the combustion chamber, a low pressure turbine located downstream of the high pressure turbine and driven by the exhaust gases from the combustion chamber, a core compressor driven by the low pressure turbine to supply the supply air to the combustion chamber, and a load compressor driven by the high pressure turbine, the load compressor receiving air from a second air inlet and supplying the compressed working air to the aircraft.

2. The gas turbine engine of claim 1, wherein the recuperator is disposed at least in part in the exhaust conduit and at least in part in the supply air conduit.

3. The gas turbine engine of claim 1, wherein the recuperator, the combustion chamber and the exhaust duct define a knot-shaped gas flow path.

4. The gas turbine engine of claim 3, wherein the knot-shaped gas flow path includes at least one U-turn portion.

5. The gas turbine engine of claim 1, wherein the recuperator is a cross-flow heat exchanger adapted to transfer heat from the exhaust gases leaving the combustion chamber to the supply air being supplied to the combustion chamber before the supply air enters the combustion chamber.

6. The gas turbine engine of claim 1, wherein the low pressure turbine is operatively connected to the core compressor by a low pressure spool rotatable about a rotation axis, the high pressure turbine is operatively connected to the load compressor by a high pressure spool rotatable about the rotation axis, and the high pressure spool is decoupled from the low pressure spool.

7. The gas turbine engine of claim 1, wherein the load compressor is selectively operable by an auxiliary power source and is selectively fluidly connectable to the combustion chamber via at least one valve disposed between the load compressor and the combustion chamber.

8. The gas turbine engine of claim 7, wherein the low pressure turbine and the high pressure turbine are disposed between the load compressor and the core compressor.

9. The gas turbine engine of claim 1, wherein the load compressor is selectively connectable to the inlet of the combustor, the load compressor connected to an actuator powered by an external power source, the load compressor being driven by the actuator at least during a part of a start-up cycle of the APU.

10. The gas turbine engine of claim 9, wherein the load compressor is configured to pressurize the compressed working air to a pressure higher than a pressure of sustained combustion in the combustion chamber.

11. The gas turbine engine of claim 9, wherein the load compressor is configured to pressurize the compressed working air to a pressure higher than a pressure of the supply air pressurized by the core compressor during post-start-up operation of the APU.

12. The gas turbine engine of claim 11, wherein the load compressor is connected to the high pressure turbine by a high pressure spool rotatable about a rotation axis, the core compressor is connected to the low pressure turbine by a low pressure spool rotatable about the rotation axis, and the low pressure spool is decoupled from the high pressure spool.

13. A gas turbine auxiliary power unit (APU), comprising:
a combustion chamber,
a supply air conduit fluidly connected to the combustion chamber to direct supply air to the combustion chamber, the supply air conduit including an inlet duct defining a first air inlet;
an exhaust conduit fluidly connected to the combustion chamber to convey exhaust gases from the combustion chamber,
the supply air conduit and the exhaust conduit being in part defined by a recuperator, the recuperator supporting at least part of the supply air conduit in the exhaust conduit, and
a high pressure turbine driven by the exhaust gases from the combustion chamber, a low pressure turbine located downstream of the high pressure turbine and driven by the exhaust gases from the combustion chamber, a core compressor driven by the low pressure turbine to supply the supply air to the combustion chamber, and a load compressor driven by the high pressure turbine, the load compressor receiving air from a second air inlet and adapted to supply compressed working air to an aircraft.

14. The gas turbine APU of claim 13, further comprising a casing, the casing supporting the exhaust conduit.

15. The gas turbine APU of claim 13, wherein the exhaust conduit is defined in part by an exhaust duct, the recuperator is at one end fixed relative to the exhaust duct and at another end is movable relative to the exhaust duct in response to thermal expansion.

16. The gas turbine APU of claim 15, wherein the recuperator is at the one end fixed to an air inlet of the combustion chamber and fluidly connects the supply air conduit to the air inlet.

17. The gas turbine APU of claim 16, wherein the recuperator, the combustion chamber and the exhaust duct define a gas flow path, and the gas flow path includes: i) a U-turn portion upstream of the recuperator, and ii) a point in the recuperator at which the exhaust gases overlap with a flow of the supply air, the exhaust gases being fluidly separated from the flow of the supply air in the recuperator.

18. The gas turbine APU of claim 13, wherein the recuperator is disposed in heat transfer communication with the exhaust gases of the exhaust conduit and the supply air of the supply conduit.

19. The gas turbine APU of claim 13, wherein the low pressure turbine is operatively connected to the core compressor by a low pressure spool rotatable about a rotation axis, the high pressure turbine is operatively connected to the load compressor by a high pressure spool rotatable about the rotation axis, and the high pressure spool is decoupled from the low pressure spool.

20. The gas turbine APU of claim 13, wherein the load compressor is selectively operable by an auxiliary power source and is selectively fluidly connectable to the combustion chamber via at least one valve disposed between the load compressor and the combustion chamber.

21. The gas turbine APU of claim 20, wherein the low pressure turbine and the high pressure turbine are disposed between the load compressor and the core compressor.

22. The gas turbine APU of claim 13, wherein the load compressor is selectively connectable to the inlet of the combustor, the load compressor connected to an actuator powered by an external power source, the load compressor being driven by the actuator at least during a part of a start-up cycle of the APU.

23. The gas turbine engine of claim 22, wherein the load compressor is configured to pressurize the working air to a pressure higher than a pressure of sustained combustion in the combustion chamber.

24. The gas turbine engine of claim 22, wherein the load compressor is configured to pressurize the working air to a pressure higher than a pressure of the supply air pressurized by the core compressor during post-start-up operation of the APU.

25. The gas turbine engine of claim 24, wherein the load compressor is connected to the high pressure turbine by a high pressure spool rotatable about a rotation axis, the core compressor is connected to the low pressure turbine by a low pressure spool rotatable about the rotation axis, and the low pressure spool is decoupled from the high pressure spool.

26. A gas turbine auxiliary power unit (APU), comprising:
a casing at least partially supporting a recuperator,
a combustion chamber supported by the casing, the combustion chamber having an inlet fluidly connected to a first part of the recuperator, the inlet of the combustion chamber receiving air through the first part of the recuperator when the APU is in use, and an exit, and
an exhaust duct fluidly connecting the exit to a second part of the recuperator, the exhaust duct exhausting exhaust gases from the combustion chamber via the exit and then via the second part of the recuperator when the APU is in use, the exhaust duct being attached to the recuperator so as to be structurally supported thereby,
a low pressure spool rotatable about a rotation axis, with a low pressure turbine in fluid communication with the exhaust duct, the low pressure turbine being operatively connected to the low pressure spool,
a high pressure spool rotatable about the rotation axis, with a high pressure turbine in fluid communication with the exhaust duct, the high pressure turbine being operatively connected to the high pressure spool,
a core compressor fluidly connected to the first part of the recuperator and receiving air form a first air inlet, the core compressor being operatively connected to the low pressure spool, the core compressor producing a lower compression ratio than a load compressor of the gas turbine APU, and
the load compressor operatively connected to the high pressure spool, the load compressor being adapted to receive air from a second air inlet and supply a fluid to a subsystem of an aircraft.

27. The gas turbine APU of claim 26, wherein the exhaust duct is disposed at least in part between the recuperator and the low pressure spool.

28. The gas turbine APU of claim 27, wherein the exhaust duct is disposed at least in part between the core compressor and the combustion chamber.

29. The gas turbine APU of claim 28, wherein the exhaust duct is disposed at least in part between the low pressure turbine and the recuperator.

30. The gas turbine APU of claim 26, wherein the combustion chamber is disposed at least in part between the load compressor and the recuperator.

* * * * *